United States Patent [19]

Amunson

[11] 4,244,674
[45] Jan. 13, 1981

[54] DRAG FEED DEVICE FOR GRINDER-MIXER MACHINES

[75] Inventor: Milton Amunson, Soldier, Iowa

[73] Assignee: Art's-Way Manufacturing Company, Armstrong, Iowa

[21] Appl. No.: 80,560

[22] Filed: Oct. 1, 1979

[51] Int. Cl.³ .............................................. B60P 1/40
[52] U.S. Cl. .................................... 414/523; 414/503
[58] Field of Search .............................. 414/503–505, 414/523, 526

[56] References Cited

U.S. PATENT DOCUMENTS

| | | | |
|---|---|---|---|
| 2,539,021 | 1/1951 | Kitchens | 414/523 |
| 2,650,723 | 9/1953 | Sammer | 414/523 |
| 4,119,223 | 10/1978 | Fiechter | 414/523 |

FOREIGN PATENT DOCUMENTS 971792 10/1964 United Kingdom ..................... 414/503

Primary Examiner—Robert W. Saifer
Attorney, Agent, or Firm—Williamson, Bains, Moore & Hansen

[57] ABSTRACT

An adjustable drag feed device for a mobile grinder-mixer machine is mounted on the chassis of the grinder-mixer machine by a support arm which permits lateral swinging movement of the drag feed device between a transport position and selected operative positions. A short pivot arm pivotally interconnects the drag feed device with the support arm. The drag feed device may shift longitudinally a short distance about the short pivot arm to thereby permit the infeed end of the drag feed device to be optimally positioned with respect to the discharge chute of a bin from which material is discharged into the drag feed device.

5 Claims, 5 Drawing Figures

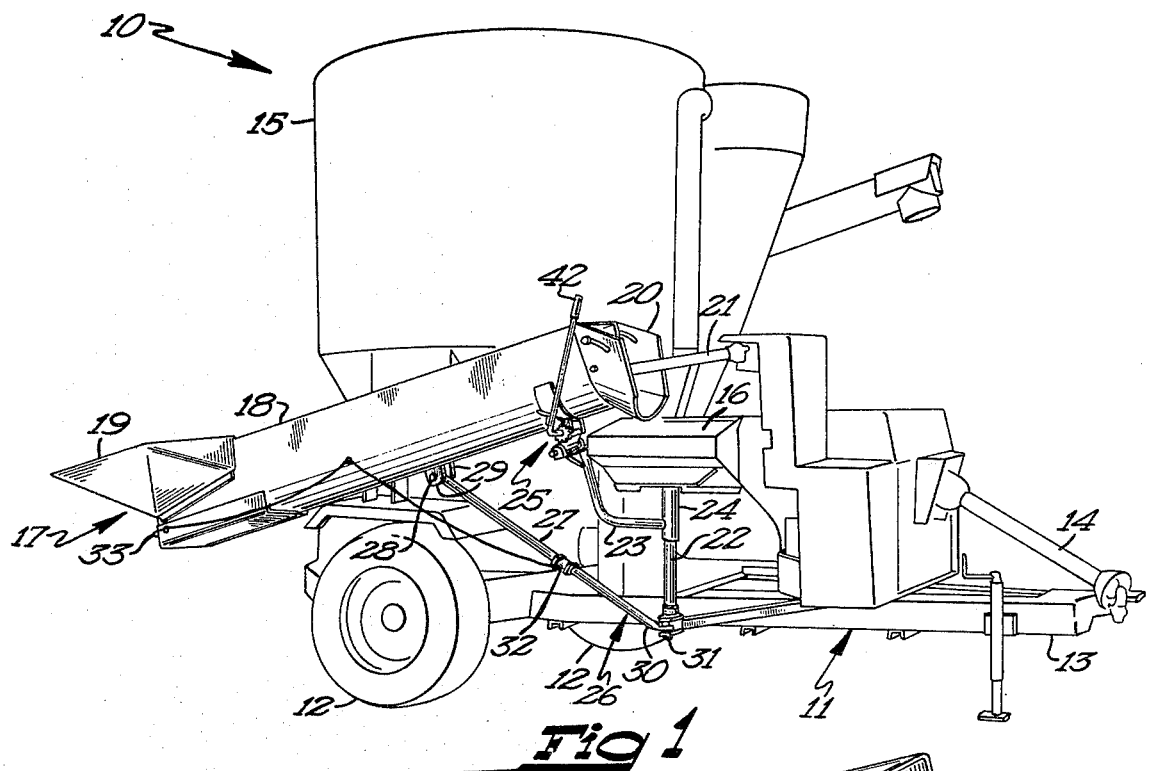

DRAG FEED DEVICE FOR GRINDER-MIXER MACHINES

SUMMARY OF THE INVENTION

This invention relates to grinder-mixer machines and more particularly to a grinder-mixer machine having an adjustable drag feed device.

Commerical grinder-mixer machines are provided with drag feed devices which convey feed material to the grinder-mixer machine. The drag feed device is pivotally mounted on the chassis of the grinder-mixer machine for lateral swinging movement from a transport position to selected operative positions where the infeed hopper of the drag feed device is positioned to receive material from the storage bin containing feed material. However, it is sometimes difficult to maneuver the grinder-mixer machine so that the infeed end of the drag feed device, when swung from the transport position to the lowered operative position, will be accurately positioned to receive feed material from the storage structure. When the drag feed device is in the lowered operative position, the infeed hopper is supported on the ground, and it is difficult to back the grinder-mixer machine when the drag feed is in this position.

It is therefore a general object of this invention to provide a grinder-mixer machine with an adjustable drag feed device which may be mechanically shifted longitudinally a short distance after the drag feed device is in the lowered operartive position. With this arrangment, the drag feed device may be accurately positioned with respect to the feed storage structure after the drag feed device has been shifted to its operative lowered position.

More specifically, it is an object of this invention to provide the drag feed device of the grinder-mixer machine with an eccentric pivot mechanism which is operable for shifting the drag feed device longitudinally a short distance to permit accurately positioning of the infeed hopper of the drag feed device with respect to the feed storage structure.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a front perspective view of a grinder-mixer machine incorporating the adjustable drag feed device;

FIG. 2 is a fragmentary exploded perspective view of a portion of the adjustable drag feed device illustrating various components thereof;

DESCRIPTION OF THE PREFERRED EMBODIMENT OF THE INVENTION

Figure 3:
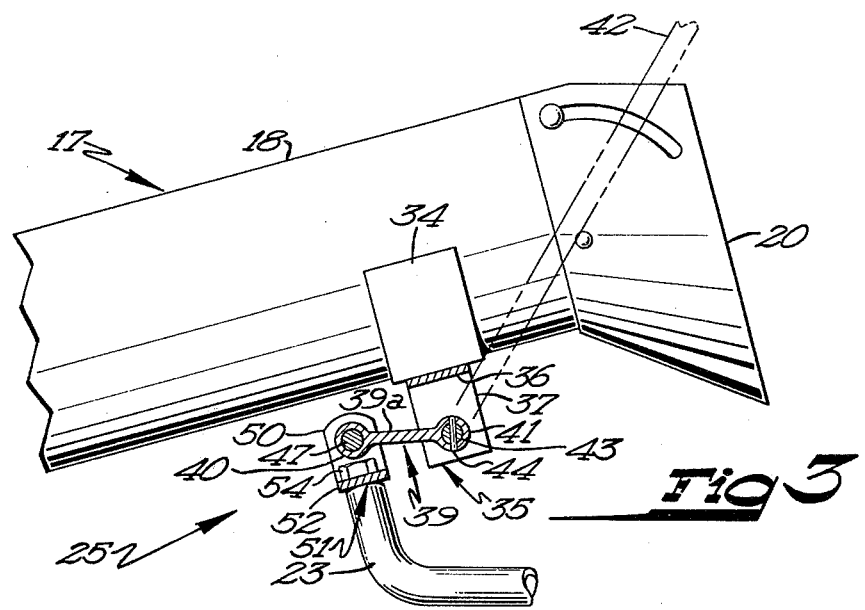
FIG. 3 is a fragmentary elevational view of a portion of the drag feed device illustrating the feed device in one longitudinal position.
Figure 4:
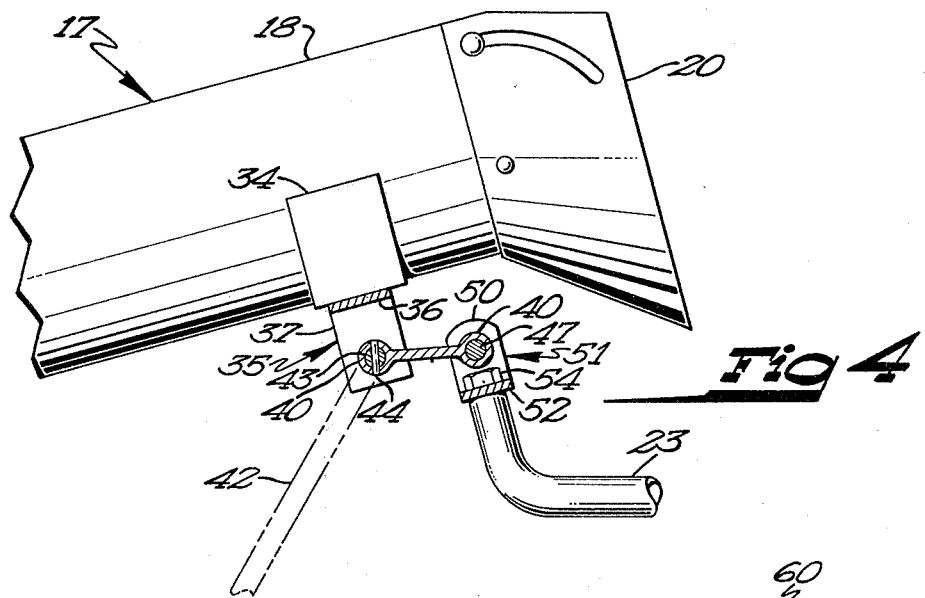
FIG. 4 is a fragmentary elevational view similar to FIG. 3 but illustrating the drag feed device in another longitudinal position.

Referring now to the drawings and more specifically to FIG. 1, it will be seen that one embodiment of a commerical grinder-mixer machine, generally designated by the reference numeral 10, is thereshown. The grinder-mixer machine 10 is of the type conventionally used in agricultural operations for grinding and mixing feed for livestock. The grinder-mixer machine 10 includes a chassis 11 having suitable ground engaging wheels 12 for travel over the surface of the ground. The chassis is provided with a hitch 13 which is adapted to be connected to a towing vehicle such as a tractor of the like.

The grinder-mixer machine 10 also includes a power-take-off assembly 14 for driving the various components of the machine including the mixing auger in the mixing tank 15. The grinder-mixer machine 10 also includes an infeed hopper 16 in which feed material, concentrate and the like is introduced for grinding and/or mixing. Means are provided for delivering feed material to the grinder-mixer machine 10 and this includes a drag feed device 17 which comprises an elongate auger housing 18 in which is disposed a conventional auger (not shown). The auger housing 18 has an infeed end which is provided with an upwardly opening hopper 19 and is also provided with a discharge end having an adjustable discharge chute 20 adjustably secured thereto and positioned over the infeed hopper 16. A telescoping power-take-off section 21 is drivingly connected with the auger of the drag feed device, and is also drivingly connected to the power-take-off 14 which is connected to the towing vehicle.

The drag feed device 17 is swingably mounted on the chassis of the grinder-mixer machine for swinging movement about a substantially vertical axis between a transport position, as illustrated in FIG. 1, to a lowered operative position wherein the hopper 19 of the drag feed device is positioned upon the surface of the ground below a storage structure from which the feed material is discharged. The chassis 11 is therefore provided with an upstanding pivot post 22 which is rigidly affixed to one side thereof and which projects upwardly therefrom. A generally L-shaped pivot arm 23 is provided with a sleeve 24 at its lower end which is positioned around the pivot post 22 for rotation thereon. The upper end of the arm 23 is interconnected to the lower surface of the housing adjacent the discharge end thereof by positioning mechansim 25.

An elongate telescoping stabilizing link structure 26 is also interconnected to the drag feed device and chassis for stabilizing and partially supporting the drag feed device. The stabilizing link structure 26 includes an elongate link member 27 which is pivotally connected at one end by a pivot 28 to a pair of ears 29 secured to the lower surface of the auger housing 18 intermediate the ends thereof. One end portion of a second link member 30 projects telescopically into the link member 27 and is pivotally connected at its other end by a pivot 31 to the lower end of pivot post 22. A releasable lock mechanism 32 is mounted on the link member 27 and is adapted to releasably lock the stabilizing link in an adjusted position. An actuating cable 33 is connected to the lock mechanism 32 for releasing the lock mechanism which is normally urged to the locked position.

When it is desirable to prepare feed for livestock, the grinder-mixer machine is maneuvered to a position adjacent a storage bin, and the drag feed device 17 is then swung from the transport position laterally of the grinder-mixer machine so that the hopper 19 is positioned below the discharge of the storage bin. However, an operator often discovers that the hopper 19 is not positioned below the discharge of the storage bin to optimally receive material therefrom but needs to be shifted longitudinally a few inches. However, it is difficult to maneuver the grinder-mixer machine 10 when the drag feed device 17 is positioned on the ground especially when the grinder-mixer machine is required to be moved rearwardly. In this regard, the positioning mechanism 25 serves to permit longitudinal shifting of the drag feed device 17 a few inches in either direction after the drag feed device has been shifted to the lowered, operative position.

The positioning mechanism 25 includes a generally U-shaped reinforcing strap 34 at the discharge of the auger housing. A generally U-shaped bracket 35 is secured to the reinforcing strap 34 and includes a web portion 36 having a pair of depending legs 37 integrally formed therewith. It will be seen that the legs 37 are each provided with an opening 38 therein.

The positioning mechanism includes a generally rectangular shaped pivot member or arm 39 which is provided with an upper sleeve 40 and a lower sleeve 41, each being integral with one of the longitudinal edges of the pivot arm. An elongate actuating lever 42 is provided having an offset portion 43 integral therewith and extending in right angular relationship therefrom. The right angular offset portion 43 projects through the apertures 38 in the bracket 35 and through the sleeve 40 in the pivot arm 39. Pins 44 extend through opening 40a in the sleeve 40 and openings 43a in the offset portion 43 of the actuating lever 42. Thus, the actuating lever is locked to the pivot arm 39. It will also be noted that the angular offset portion 43 of the actuating lever is provided with a ratchet wheel 45 having teeth 46 throughout its circumference.

An elongate pivot rod 47 projects through apertures 49 in the legs 50 of a generally U-shaped bracket 51. The pivot rod 47 also projects through the lower sleeve 41 of the pivot arm 39 and suitable cotter keys 48 project through the openings in the ends of the pivot rods to secure the pivot rod to the bracket 51. The web portion 52 of the bracket 51 has an aperture 53 therein to which a bolt 54 projects to secure the bracket to the upper end of the L-shaped arm 23. With this arrangement, it will be seen that the drag feed device 17 may pivot relative to the L-shaped arm 23 about a transverse axis defined by the pivot axis between a pivot arm 39 and the bracket 51. Pivoting movement of the drag feed device 17 about this axis shifts the drag feed device longitudinally in either direction. The amount of shifting is determined by the length of the pivot arm 39.

Figure 5:
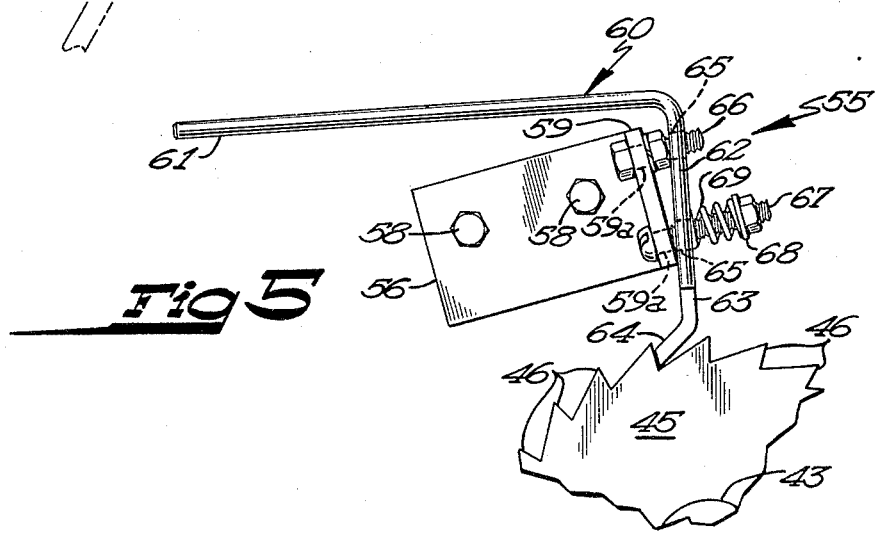
FIG. 5 is an enlarged, detailed elevational view of the locking means used to lock the drag feed device in an adjusted longitudinal position.

Means are provided for releasably locking the drag feed device in an adjusted longitudinal position and include a generally L-shaped bracket 55 comprised of a leg 56 having a pair of openings 57 therein for accommodating bolts 58 therethrough. The bolts 58 threadedly engage openings in one of the legs 37 of the bracket 35. The L-shaped bracket 55 also includes a leg 59 to which is pivotally mounted a ratchet lock element 60 including a handle 61 and downturned portion 62. The downturned portion 62 includes a lower end portion 63 which terminates in a detent 64. In this regard, the leg 59 is provided with a pair of openings therethrough 59a each of which is disposed in registering relation with one of a pair of openings in the downturned portion 62. A pivot bolt 66 projects through one pair of openings in the leg 59 and the downturned portion 62. A bolt 67 projects through the other registering openings in the leg 59 and downturned portion 62 and a nut threadedly engages the outer end thereof. A spring 69 bears against a collar 68 and the downturned portion to resist movement of the lock element in a clockwise direction, as viewed in FIG. 5.

It will be noted that the angularly offset terminal detent 64 is urged into engaging relation with the ratchet wheel 45. The handle 66 facilitates pivoting of the lock element to release the terminal portion thereof from locked relation with respect to the ratchet wheel 45.

In operation, the grinder-mixer will be towed to the storage bin or other storage structure containing feed material. The grinder-mixer will be maneuvered so that when the drag feed device is shifted from the transport position, as illustrated in FIG. 1, to a lowered, operative position, the hopper 19 will be positioned below the discharge of the storage structure to receive the feed material therefrom. Therefore, when the drag feed device 17 is swung from the transport position about the pivot defined by the pivot post 22, the ratchet lock element 60 will be in engaging relation with the ratchet wheel 45 and will prevent the drag feed device from pivoting about the transverse axis defined by the pivot arm 39. In this regard, the pivot arm 39 will be inclined slightly forwardly and the actuating lever 42 will be projecting essentially vertically upwardly, as illustrated in FIG. 1. If the operator finds that it is necessary to shift the drag feed device in a longitudinal rearward direction, the operator will release the ratchet lock element 60 from engaging relation with respect to the ratchet wheel and will move the actuating lever 42 in a rearward direction and thereby shift the entire drag feed device longitudinally in a rearward direction. This shifting movement of the drag feed device is only a few inches since final positioning of the hopper ordinarily only requires movement of a short distance. If it is necessary to shift the drag feed device in a forward direction from the normal neutral or middle position, after the drag feed device has been swung laterally from its transport position to the desired angular position, then the actuating lever may be swung forwardly to shift the entire drag feed device forwardly.

From the foregoing description, it will be seen that the positioning mechanism permits the drag feed device to be accurately positioned without necessitating movement of the entire grinder-mixer machine. Thus, it will be seen that I have provided a novel adjustment mechanism for very easily and accurately positioning the drag feed device of a grinder-mixer machine to optimally position the infeed hopper thereof with respect to a feed structure. Although an auger type conveyor is illustrated with the grinder-mixer machine, other type conveyors may be used.

Thus, it will be seen that I have provided a novel grinder-mixer machine which is not only of simple and inexpensive construction, but one which functions in a more efficient manner than any heretofore known comparable device.

It is anticipated that various changes can be made in the size, shape and construction of the grinder-mixer machine disclosed herein without departing from the spirit and scope of my invention as defined by the following claims.

What is claimed is:

1. An adjustable drag feed device for mobile grinder-mixer machines including a chassis having ground engaging wheels, a mixing tank mounted on the chassis, and an inlet hopper on said chassis for receiving materials to be ground and mixed, said adjustable drag feed device comprising:

an elongate, auger housing of generally U-shaped cross-sectional configuration having a dicharged end and having an inlet end, an auger in said auger housing for moving material from the inlet end to the discharge end, means mounting said auger housing on said chassis including a support arm pivotally connected with respect to the chassis for swinging movement about a vertical axis to which permits lateral swinging movement of the drag feed device about the vertical axis between a transport position and a selected operative position extending angularly outwardly from the chassis, means interconnecting said support arm with said auger housing adjacent the discharge end of the latter, said interconnecting means including a pivot arm pivotally connected at one end to said support arm to permit relative pivoting movement therebetween about a horizontal pivoting axis extending transversely of the auger housing, said pivot arm being pivotally connected at its other end with said auger housing, actuating means connected with the other end of said pivot arm causing pivoting movement of the pivot arm about the horizontal pivot axis between the pivot arm and the support arm to shift the drag feed device in a longitudinal direction, and releasable lock means on said auger housing and said actuating means for releasably locking the drag feed device in a selected position when shifted in a longitudinal direction.

2. The device as defined in claim 1 wherein said actuating means includes an elongated handle affixed to said pivot arm and projecting therefrom.

3. The device as defined in claim 2 wherein said lock means includes a ratchet wheel on said handle, and a detent on said auger housing yieldably engaging said wheel.

4. The device as defined in claim 1 wherein said pivot arm is pivotally connected to said support arm at the upper end of the latter.

5. An adjustable drag feed device for mobile grinder-mixer machines including a chassis having ground engaging wheels, a mixing tank mounted on the chassis, and an inlet hopper on said chassis for receiving materials to be ground and mixed, said adjustable drag feed device comprising:

an elongate, conveyor housing of generally U-shaped cross-sectional configuration having a discharged end and having an inlet end, a conveyor in said housing for moving material from the inlet end to the discharge end, means mounting said housing on said chassis including a support arm pivotally connected with respect to the chassis for swinging movement about a vertical axis which permits lateral swinging movement of the drag feed device about the vertical axis between a transport position and a selected operative position extending angularly outwardly from the chassis, means interconnecting said support arm with said housing adjacent the discharge end of the latter, said interconnecting means including a pivot arm pivotally connected at one end to said support arm to permit relative pivoting movement therebetween about a horizontal pivoting axis extending transversely of the housing, said pivot arm being pivotally connected at its other end with said housing, actuating means connected with the other end of said pivot arm causing pivoting movement of the pivot arm about the horizontal pivot axis between the pivot arm and the support arm to shift the drag feed device in a longitudinal direction, and releasable lock means on said conveyor housing and said actuating means for releasably locking the drag feed device in a selected position when shifted in a longitudinal direction.

* * * * *